(12) United States Patent
Ericson

(10) Patent No.: US 10,803,476 B2
(45) Date of Patent: Oct. 13, 2020

(54) MONITORING DEVICE APPLICATION USAGE FOR COMPLETION OF CHECKOUT DATA PROCESSING

(71) Applicant: PAYPAL, INC., San Jose, CA (US)

(72) Inventor: Braden Christopher Ericson, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 277 days.

(21) Appl. No.: 15/856,870

(22) Filed: Dec. 28, 2017

(65) Prior Publication Data
US 2019/0205912 A1    Jul. 4, 2019

(51) Int. Cl.
*G06Q 30/02*  (2012.01)
*G06Q 30/06*  (2012.01)

(52) U.S. Cl.
CPC ..... *G06Q 30/0222* (2013.01); *G06Q 30/0239* (2013.01); *G06Q 30/0633* (2013.01); *G06Q 30/0641* (2013.01)

(58) Field of Classification Search
CPC ..................................................... G06Q 30/02
See application file for complete search history.

(56) References Cited

U.S. PATENT DOCUMENTS

| | | | | |
|---|---|---|---|---|
| 8,935,797 B1* | 1/2015 | Silver | ................ | G06F 21/6254 |
| | | | | 726/26 |
| 9,639,888 B2* | 5/2017 | Proulx | ............... | G06Q 30/0641 |
| 2003/0065577 A1* | 4/2003 | Haynes | .................. | G06Q 30/06 |
| | | | | 705/26.8 |
| 2008/0133349 A1* | 6/2008 | Nazer | ................ | G06Q 30/0239 |
| | | | | 705/14.39 |
| 2012/0239486 A1* | 9/2012 | Hu | ...................... | G06Q 30/0207 |
| | | | | 705/14.39 |
| 2016/0142354 A1* | 5/2016 | Whitnah | ............... | H04L 47/783 |
| | | | | 709/205 |
| 2017/0364958 A1* | 12/2017 | Kirti | .................. | G06Q 30/0275 |

* cited by examiner

*Primary Examiner* — Marilyn G Macasiano
(74) *Attorney, Agent, or Firm* — Haynes and Boone, LLP

(57) ABSTRACT

There are provided systems and methods for monitoring device application usage for completion of checkout data processing. A computing device may be utilized to perform one or more actions while utilizing an application executable by the device, including a browser application or merchant application that allows a user to view an online marketplace and purchase items in a transaction. Prior to checkout and transaction processing, the device may be used to browse items, and items may be added to a shopping cart. However, the device may not finish electronic transaction processing for the items, for example, where the device does not enter transaction processing details and/or navigates away from the items or cart. A service provider may utilize past actions to determine whether the action indicates that the device is abandoning use of the application, including electronic transaction processing. If so, an incentive may be provided to continue use.

20 Claims, 5 Drawing Sheets

MONITORING DEVICE APPLICATION USAGE FOR COMPLETION OF CHECKOUT DATA PROCESSING

TECHNICAL FIELD

The present application generally relates to device application usage and actions taken in devices that indicate potential application usage and more specifically to monitoring and processing past device input and usage to identify when current application usage indicates abandonment of application processing.

BACKGROUND

Device applications may be utilized by users to engage with online resources, including online merchant marketplaces and other electronic shopping forums that allow users to purchase items in an electronic transaction. During use of a device application, user input may be used to navigate between interfaces, view data, and otherwise engage in computing processes available to the application, device, and/or device operating system. Some such actions may be utilized to shop for items on an online marketplace.

However, during use of the application, a user may not complete a process, for example, by abandoning the process so that the process is not completed using the online resource. Such processes may include checkout and electronic transaction processing for one or more items on the online marketplace, such as completion of processing for a digital shopping cart including the item(s). Thus, the merchant providing the item on the online marketplace may fail to convert the potential transaction with the user to a purchased transaction and sale. However, without knowledge that the user may abandon use of the application, the merchant may not take steps to attempt to convert the transaction to a completed transaction. Thus, the merchant is unable to provide actionable data to the device during application usage that may affect future processes taken in the application.

Figure 1:
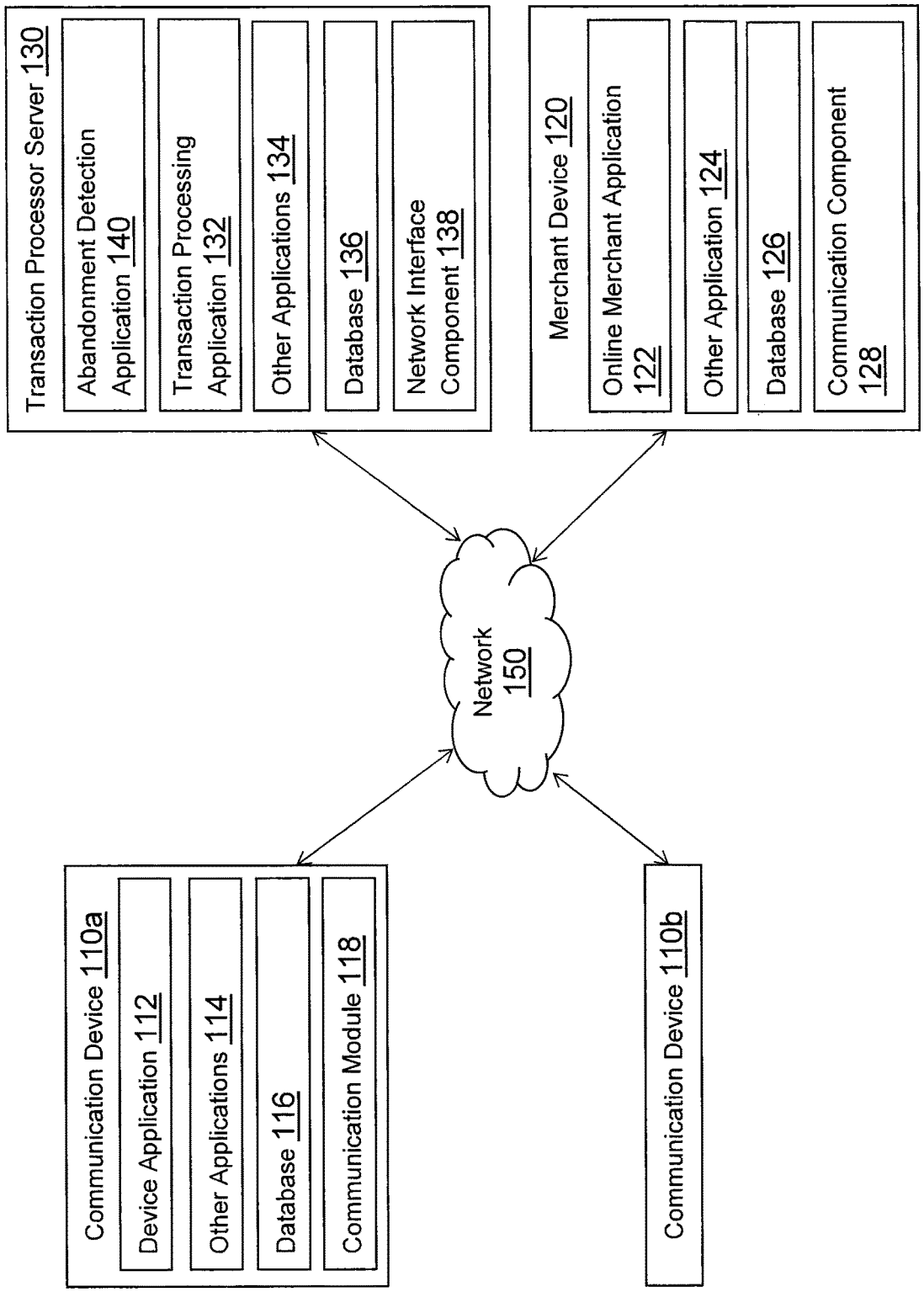
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for monitoring device application usage for completion of checkout data processing. Systems suitable for practicing methods of the present disclosure are also provided.

One or more entities, such as personal users or consumers, groups of users, merchants, businesses, or other commercial agencies, may utilize device applications and/or online resources that may be interacted with through a device to perform one or more computing processes. For example, an application may allow a user to request and receive data, view the data, interact with the data, and/or transmit the data or other data between disparate devices over a network connection. In certain embodiments, the application may correspond to a browser application or dedicated device application that may be used to access an online merchant marketplace and shop for one or more items. Thus, the computing processes may correspond to processes to browse and view data from the online marketplace, as well as process electronic transactions for items available on the online marketplace. However, other applications may also utilize the processes described herein to provide an incentive or predictive data output that encourages or incentivizes a user to complete a process using the application and/or the online resource.

These computing processes may therefore include electronic transaction processing services for electronic transactions, including online transactions to purchase one or more items from or on an online merchant marketplace. Various service providers may provide these transaction processing services that may allow these two or more entities to engage in electronic transaction processing, including processing of a digital shopping cart created by an entity on the online merchant marketplace and having the item(s) selected by the entity or consumer for purchase.

For example, a payment provider or transaction processor service may offer online electronic transaction processing services that provide transfers, payment services, and other type of financial services including payment account establishment and/or management. These service providers may further provide additional types of benefits, features, and/or processes to users, such as fraud protection and incentives for completing electronic transactions and purchasing items on the online marketplace, as discussed herein. These electronic transaction processing services may be accessed through an application on the computing device, and may be included within another application or website of another entity (e.g., an online merchant or marketplace) using the services and processes of the service provider.

When utilizing the application, the user device may perform specific computing processes. The use of the application may therefore correspond to an application use session that utilizes the application's processes. In various embodiments, the use of one or more of the application's processes may cause the application to interact with another device, server, or entity (e.g., cloud computing server(s)), where the application requests communication with the separate entity for data transmission, retrieval, and/or processing with the disparate entity. The use of the application may be linked to one or more processes with the networked or online entity/resource, and the use/process(es) may be identified by the requested usage and processes of the application by the computing device. The application and/or a service provider may track application usage and processes engaged in and/or executed by the application, which may be utilized as discussed herein to determine current use and/or executing/executed processes of the application, as well as past processes executed by the application and past usage of the application with their corresponding user input to perform such past application processing.

As discussed above, the use of the application may correspond to a shopping session that indicates an interest in one or more items, for example, by adding the item(s) to a digital shopping cart for a process to purchase the item(s) from an online merchant and/or marketplace and perform electronic transaction processing for the item(s). A user using an application of the computing device may generate the digital shopping cart during a use session of the application's processes. The online merchant, marketplace, and/or service provider may allow for generation of the digital shopping cart through browser or dedicated application usage and processes, for example, the processes to browse items, select items for purchase, and move the items to a digital shopping cart or other checkout process. The digital shopping cart may be created by a user through user input, and may be generated through use of an account or other identifier for the user, device, and/or application. The application may be used to access one or more interfaces and processes of the online merchant or marketplace to enter user input, allow for browsing, and generate the digital shopping cart. For example, a graphical user interface of a device used to access the application, retrieve and display data for the online merchant or marketplace (e.g., through in a web site or a dedicated application), transmit data used to generate the digital shopping cart, and allow the user to utilize the application for processing of the digital shopping cart, including accessing an account to checkout and complete an electronic transaction for the digital shopping cart as well as view additional information.

During the session of application use that generates the digital shopping cart, user input to the device may request one or more actions to be taken by the device when utilizing the application. Thus, the user may provide input during the use of the application and/or online resource/service, which may correspond to a requested action taken by the device with the application/service. For example, user input may be used to request execution of a process of the device/application, which causes the device to execute some software task or routine that accomplishes a particular function of the application, service, and/or operating system. These actions may occur after certain application processing, such as after beginning use of the application, executing application processes, and communicating data with an online merchant, marketplace, or other entity/resource. For example, after a user utilizes a device to open and execute an application, and begins using the application, the actions may result from further user input that requests the device perform some operation or task. With regard to tasks or operations performed during a shopping use session with an online merchant or marketplace, the actions may result from user input associated with browsing the marketplace and generating the digital shopping cart.

The actions may indicate that the user wishes to abandon processing the digital shopping cart and will not purchase the items during the current session or use of the application. The actions may correspond to user input that indicates whether the device is requested to continue the use or process of the application, or whether the device is requested to perform a different process and may abandon the current use or process. For example, the action may correspond to an operation to navigate to another window or interface, such as utilizing a mouse cursor or keyboard shortcut to close a browser window, exit an application, or navigate to another browser window, tab, or application interface. The action may correspond to navigations to other device processes or applications, or may include navigation within the application.

Other types of actions include whether the user enters authentication credentials, browses another item, removes items from a shopping cart, returns to a home screen, locks a device or goes into a screensaver, sleep, or standby mode, etc. The merchant and/or service provider may implement a code package, snippet, or other software process that may detect the action, and further may listen for data of the executing process so that the action that may provide user input to the executing process and/or cause abandonment of the executing process, as well as any data necessary for identifying the executing process and the current state of the process, may be acquired and determined. The code may correspond to a respective version, instance, or particular copy of the code that may be implemented in each different merchant platform, such as code for a specific website or application and/or versions or instances of code for specific merchant requirements. Thus, the code may not be the exact same code, either the same instance of the code or the same copy of the code. For example, the code may correspond to a different instance that is implemented in each respective merchant platform. The code may also be configured, re-coded, or written in a different coding language and/or with different process properties and features to be implemented as required by the merchant platform. However, the code may provide the same or similar functionality in each implemented platform. Such data may be processed directly by the device and/or application, or may be transmitted to the merchant's device/server and/or service provider's system for processing.

Utilizing machine learning for these actions, the service provider, application, and/or online merchant or resource (e.g., marketplace or other online service) may determine which actions indicate that the action and/or corresponding user input indicates that the device will abandon the current process being executed in the application. The service provider (or other processing entity analyzing past actions and device usage) may therefore accrue historical application usage, which may include device application usage as well as usage of an associated online service or resource. The service provider (or other entity) may process the historical application usage to identify abandonments of past processing by the application and/or with the online service. Abandonment of a use/process may correspond to a failure to complete processing of the use/process of the application/online service.

For example, the abandonment may correspond to a use or process of an application/online service that failed to reach an end processing state, such as a completion of an electronic transaction for one or more items in a digital shopping cart generated using an application and with an online service. The historical application and/or device usage may include processes that are not completed before the process is abandoned, another process begins execution, and/or the device quits from the application and/or processing with the online service. In this regard, it is noted that analysis of past historical actions, tasks, and/or operations taken by a device when utilizing an application and/or online resource (e.g., the merchant for electronic shopping) may be discussed herein as being performed by the service provider, but may also be performed by another entity. For example, the service provider may provide a software framework, software development kit (SDK), code snippet or package, or other available process for a merchant or other entity to incorporate the processes described herein to their own website, application, and/or processes. Thus, each merchant platform may utilize the SDK or other implementable code to provide a respective version or instance of the code snippet in each platform to execute the processes described herein.

These abandoned uses/processes of the application/online resource may further be associated with one or more actions, such as requested tasks or operations, that occur prior to or at the point of abandonment. For example, an action may request that the device move to another interface or application from a first application, after which the first application does not complete the pending use/process. The action may correspond to a particularly requested task, such as quitting out of the application, minimizing the application, opening a new tab or interface window of the application, or otherwise performing some task or operation using the device that end a use or process of an application/online service prior to completion of the use/process (e.g., before reaching an end state, such as completion of a transaction, which may be application, use, and/or online service specific and set by the service provider or online merchant). With a pending shopping use and generated shopping cart having one or more items pending for purchase and electronic transaction processing, the action may correspond to some action that does not complete the electronic transaction for items in the digital shopping cart and therefore does not purchase the items, resulting in a lost sale for the online merchant.

The past or historical usage information for the application and/or online service usage may be accrued over a range of users, or may be user specific. For example, the service provider may determine abandoned processes, and the actions occurring prior to abandonment that cause the abandonment (e.g., are used to abandon or quit from completing the process) for multiple users to determine which actions are associated with abandonment for multiple users. However, in other embodiments, the historical usage information for abandonment of processes may be user or account specific, device specific, and/or application specific, so that the actions that indicate and are associated with abandonment of a use/process for an application and/or online service are more specific to a certain user, account, device, and/or application.

For example, Alice may select an X icon or click a home screen button to exit from an application after placing items in a digital shopping cart during multiple past abandonments that did not lead to a sale of those items and completing electronic transaction processing for the shopping cart. Thus, when Alice begins to navigate to the X icon, clicks on the X icon, or presses the home screen button, these actions may indicate that Alice will not purchase the items in a present shopping cart and instead abandon the shopping cart. Conversely, Brian may navigate to another tab or window of a browser application when Brian has previously abandoned processing of digital shopping carts, which may be used to determine that this action indicates Brian will likely abandon a current digital shopping cart in an application interface or window.

Once historical device usage is processed to determine what past actions are associated with abandonment of certain application/online service uses and processes, these past actions may be determined to be indicators of abandonment of the associated use/processes. The service provider (or application/online merchant) may utilize data of current actions taken during an application or online service use, and process the data utilizing the past or historical application usage data to determine whether any of the actions executed during the current use of the application/online service indicates that the device or user may abandon the present use and executing processes. The data may correspond to application and/or online service processes being utilized and executed by the device, as well as user input to the device during the application/online service use.

For example, the data may correspond to data monitored and received by the service provider during the device's use of the application, which may include use of an online service to send, receive, and process data, such as an online merchant or marketplace where the device is being used to browse items for sale and/or add items to a digital shopping cart. While performing these processes, the service provider may monitor for actions that indicate that the device may abandon the process based on previous actions taken that resulted in abandonment (e.g., did not end to a completion state desired by the service provider or online service or merchant). As discussed herein, those actions may be actions determined generally from a population of multiple users when using the application and/or online service, or may be specific to the user, account, device, and/or application. If detected, the service provider may then execute a process in response to the action or event detected during the application/online service provider use.

In various embodiments, when determining whether an action may be used to determine that the device is or will likely abandon a use session and/or process of an application/online service, the service provider may utilize the action itself and the user input generating the action, and compare the action to past actions that occurred prior to or at the time of abandonment and cause the abandonment (e.g., the action that resulted in the abandonment of the process or use, such as quitting from an application, closing, locking, or shutting down a device, or moving to another process, application, or user interface). If the action is the same or similar to the previous action, then the current action may indicate that the device is abandoning or likely to abandon the process. The action may include the same or similar user inputs, or request that the same or similar executable task or operation be performed. In certain embodiments, the service provider may provide specific algorithmic weights to various actions and user inputs to determine whether those actions are similar to previous actions, for example, by weighting user inputs differently and/or by weighting user or account specific historical application usage data as more relevant than general population historical application usage data.

Thus, if the action that indicates potential or actual abandonment of an application/online service use is detected during a current use session and/or execution of a process, the service provider may utilize the action to determine output data for the device that may incentivize a user using the device to complete the process and use of the application/online service instead of abandoning the current processing. The output data determined by the service provider may correspond to an incentive, benefit, discount, reward, or loyalty program for one or more of the merchant, the online marketplace, and/or the specific application or application process (e.g., for the items in the digital shopping cart). The incentive may be provided and redeemable only if the user completes the process, for example, by finishing the process instead of abandoning the process. The incentive may therefore motivate the user to convert the process from an abandoned (or potentially abandoned process) to a completed process. In this regard, the incentive may only be redeemed and provided when the device engages in the process again, access the abandoned and incomplete process, and finishes the process to an end state for the process, such as completing electronic transaction processing for the process. The incentive may therefore be specific to the process, including the data in the process (e.g., the items in the cart).

The incentive or other output data may also be specific to the device, user, and/or account that abandoned the process, such as an incentive that is specifically tailored to convert the user to finishing the process and purchasing the items. For example, it may be determined from past completed processes that the user would prefer a percentage discount over an amount to be applied to a future purchase. Thus, the incentive may be specific to the particular user, account, or device based on a past history of completed and abandoned processes, and which incentives caused completion of the processes. In other embodiments, different data may also be output that may incentivize or remind the user to complete the process and not abandon, such as a notification of potential abandonment, an alert of the remaining time and/or length of the process, a notification about possible penalties, missed prices or incentives, or other detrimental effect that may occur as a result of abandonment, or other information.

The data for the incentive may then be generated by the service provider and communicated to the user device for output to the user. When generating the data for output by the device abandoning the process, the service provider may further store data of the abandoned process, such as currently processed data at the time of abandonment. Where the process corresponds to an electronic shopping process having an abandoned digital shopping cart with one or more items, the service provider may store data for the digital shopping cart having the items or may generate input expressions necessary to cause the digital shopping cart to be recreated or recalled from the online merchant and/or marketplace. The output data may further include a process for automatic redemption of the incentive in the output data, which may be applied to the digital shopping cart when the device utilizes the output data of the incentive to re-engage in the abandoned process using the application/online service. The output data may include a selectable link, interface button or field, or other executable process to redeem the incentive, as well as access, recall, or re-enter (e.g., resubmit the input causing creation of the shopping cart) to the merchant or marketplace to cause the digital shopping cart to be shown with the applied incentive. Thus, on display of the output data, user input may be provided to request that the output data re-enter or complete the abandoned process, which may be performed through the output data.

If the device requests further processing with the application/online service, including completion of the process such as electronic transaction processing for a digital shopping cart, the application may provide input requesting processing of the process as well as applying the incentive. In order to process an electronic transaction for a digital shopping cart, the user may be required to have an account with the service provider or other online transaction processor in order to engage in electronic transaction processing with the online merchant or marketplace. The user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide payment. In order to create an account, the user may be required to select an account name and/or provide authentication credentials, such as a password, personal identification number (PIN), answers to security questions, and/or other authentication information.

Once an account is created, the account may be accessed through a web browser from a website of the service provider and/or a dedicated application of the service provider, such as a mobile smart phone application. A token may be issued to the device of the user for their respective account, where the token may include data (which may be encrypted) allowing the service provider to identify the user and their account and authenticate the user. Thus, the token may be transmitted to other entities during transaction processing, which may allow the service provider to identify and authenticate the user's account and engage in transaction processing. Additionally, the online payment provider or other service provider may provide digital wallet services, which may offer financial services to send, store, and receive money, process financial instruments, and/or provide transaction histories. A computing device may execute a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with the service provider, such as PayPal® or other online payment provider service, which may provide payments and the other aforementioned transaction processing services on behalf of users, merchants, and other entities.

The service provider may provide processes to store and generate data for incomplete and abandoned application and/or online service uses and processes so that the service provider may recall a use and/or process for completion by a device executing the application and/or utilizing the online service provider. The service provider may further generate data for the abandoned process that may cause completion of the process, including incentives and other information that may cause a device to complete the process instead of abandoning the process. In embodiments where the process corresponds to an abandoned digital shopping cart with an online merchant or marketplace, the incentive may correspond to data necessary to resume or recall the digital shopping cart as well as apply an incentive to the digital shopping cart. In this manner, the service provider may complete initiated processing of data, and may reduce abandonment of application and online service use and processing.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110a, a communication device 110b a merchant device 120, and a transaction processor server 130 in communication over a network 150. Communication device 110a may be utilized to access the various features available for communication device 110a, which may include processes and/or applications associated merchant device 120 and/or transaction processor server 130 to engage in an application process that may utilize merchant device 120 and/or transaction processor server 130. Prior to completion of the process, such as arriving at an end state, communication device 110a may abandon the process so that the process is not completed. This may correspond to abandoning a digital shopping cart generated using one or more of merchant device 120 and/or transaction processor server 130. This may be detected through previous actions that abandon previous processes on communication device 110a, or on another communication device 110b separate from communication device 110a but used by a user associated with communication device 110a, for example, a user using an account with transaction processor server 130 to previous generate digital shopping carts and abandon those carts. In order to complete the process, transaction processor server 130 may store the data of the incomplete and/or abandoned application process that utilizes merchant device 120 and/or transaction processor server 130. Transaction processor server 130 may utilize the data of the abandoned process to determine output data for communication device 110a that incentivizes a user to complete the process. Transaction processor server 130 may output the data through communication device 110a, and may recall the abandoned process for completion based on a request from communication device 110a.

Communication device 110a, communication device 110b, merchant device 120, and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110a may be implemented as a communication device that may utilize appropriate hardware and software configured for wired and/or wireless communication with merchant device 120 and/or transaction processor server 130. For example, in one embodiment, communication device 110a may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110a of FIG. 1 contains a device application 112, other applications 114, a database 116, and a communication module 118. Device application 112 and other applications 114 may correspond to executable processes, procedures, and/or applications with associated hardware. In other embodiments, communication device 110a may include additional or different modules having specialized hardware and/or software as required.

Device application 112 may correspond to one or more processes to execute software modules and associated devices of communication device 110a to initiate, engage in, abandon, and/or complete one or more processes with merchant device 120 and/or transaction processor server 130 including processing of electronic transactions over a network for one or more items. In this regard, device application 112 may correspond to specialized hardware and/or software utilized by a user of communication device 110a to request access or executing of one or more application processes, which may utilize merchant device 120 and/or transaction processor server 130. During execution of the process, device application 112 may abandon the process, for example, by quitting from the process or not providing further user input that completes the process. Device application 112 may be closed or quit from execution, and therefore abandon a process that was executing at the time of closure of device application 112.

Thus, during a use of device application 112 and execution of a process of device application 112, device application 112 may receive user input and/or other processing input or requests that cause device application 112 to perform an operation or task. During the use or process of device application 112 one or more events or actions may be captured that may correspond to a requested task or operation of device application 112. Where the application process corresponds to a shopping, purchase, and electronic transaction processing process, device application 112 may be utilized to view one or more items for sale, select items of interest for purchase, add those items to a digital shopping cart, and complete electronic transaction processing for the digital shopping cart through providing an account or other payment instrument used to provide payment for the digital shopping cart. Device application 112 may be used to therefore access or more websites or data for application interfaces of merchant device 120, display item data and shopping information, and allow a user to generate and/or process an electronic transaction for one or more items. This may require user input and entry and execution of process actions, tasks, or operations, which may be input using one or more input devices of communication device 110a and may correspond to recordable actions.

The action may correspond to the aforementioned user input, and may correspond to a request to continue the use or process currently executing and complete the process (e.g., by providing further input and/or allowing the process to finish), or quit and abandon the process so that the process is not completed. For example, actions that may be used to abandon a process may correspond to navigating to another user interface, tab, or application, closing of the application through a command or input (e.g., moving a mouse to an interface field or option to close device application 112), entry of a hotkey or shortcut to move to another interface or application or close device application 112, remove items from a digital shopping cart, navigating to another website, or otherwise providing input that is associated with an abandoned process. The use or process of device application 112 may be provided to transaction processor server 130 for processing and determination of historical application usage of device application 112 and/or incentive data for an incentive to complete a process, as discussed herein. Where an incentive is determined by transaction processor server 130, the incentive may also be output through device application 112.

Device application 112 may utilize one or more user interfaces, such as graphical user interfaces presented using an output display device of communication device 110*a*, to enable the user associated with communication device 110*a* to access and execute on or more processes, including accessing online merchant or marketplace data, generate a digital shopping cart for one or more items, and complete a transaction to purchase the items in the digital shopping cart (or abandon processing of the digital shopping cart through one or more actions taken during use of device application 112). In various embodiments, device application 112 may correspond to a general browser application configured to retrieve, present, and communicate information over the Internet (e.g., utilize resources on the World Wide Web) or a private network.

For example, device application 112 may provide a web browser, which may send and receive information over network 150, including retrieving website information (e.g., a website for transaction processor server 130), presenting the website information to the user, and/or communicating information to the website, including payment information for transaction processed through transaction processor server 130. However, in other embodiments, device application 112 may include a dedicated application of transaction processor server 130 or other entity (e.g., a merchant), which may be configured to assist in processing transactions electronically, including transactions for digital shopping cart processing. The interface(s) providing by device application 112 may be utilized to engage in electronic transaction processing, including online purchases for electronic transaction processing processes.

Device application 112 may further be used to process an electronic transaction, such as processing a digital shopping cart generated with merchant device may be used to access a website or an interface of a merchant or service provider that allows communication device 110*a* to select items for purchase and engage in electronic transaction processing for a digital shopping cart. During processing of the shopping cart, including resuming processing of the shopping cart after previously abandoning processing, device application 112 may be utilized to select payment instrument(s) for use in providing payment for a purchase transaction, transfer, or other financial process. As discussed herein, device application 112 may utilize user financial information, such as a credit card, bank account, or other financial account, as a payment instrument when providing payment information. Additionally, device application 112 may utilize a digital wallet stored with an account with a payment provider, such as transaction processor server 130, as the payment instrument, for example, through accessing a digital wallet or account of a user with transaction processor server 130 through entry of authentication credentials and/or by providing a data token that allows for processing using the account.

Device application 112 may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant to authenticate the account, digital wallet, and/or payment instruments to transaction processor server 130 and allow for transaction processing and payment using the account, digital wallet, and/or payment instruments. Selection of a payment instrument may occur prior to, at, or after establishment of the shopping cart processing. Device application 112 may also be used to apply an incentive to the purchase, including one generated by transaction processor server 130 after abandoning initial processing of the shopping cart. Device application 112 may be utilized to view the results of payment, for example, using transaction histories, dispute resolution processes, and other post-transaction process.

In various embodiments, device application 112 may be utilized to create an account used to process the digital shopping cart and/or engage in other transaction processing. In this regard, device application 112 may be used to enter one or more payment instruments or other funding sources for storage in a digital wallet associated with a payment account (e.g., stored and/or serviced by transaction processor server 130), access the digital wallet and/or payment account for use, and engage in transaction processing with another entity. Device application 112 may provide an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with transaction processor server 130 for use with an online digital wallet and/or account for the user, which may be utilized for transaction processing with another entity, such as a merchant associated with merchant device 120.

In various embodiments, information for the account may also be stored in communication device 110*a* for use in an offline environment. The account accessible through device application 112 may be used to initiate, receive, and/or process/complete transactions using services provided by transaction processor server 130. Once entered, the payment instruments may be communicated to transaction processor server 130 over network 150 by device application 112 for establishment and/or maintenance/update of the account and/or entry into the digital wallet for the user. The user of communication device 110*a* may also enter benefits to device application 112, which may include incentives that were providing to finish processing an abandoned process of device application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons. However, in other embodiments, device application 112 may access and utilize a previously established account.

In various embodiments, communication device 110*a* includes other applications 114 as may be desired in particular embodiments to provide features to communication device 110*a*. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110a and processes the location information to determine a location of communication device 110a and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110a, such as display devices capable of displaying information to users and other output devices, including speakers.

Communication device 110a may further include database 116 stored in a transitory and/or non-transitory memory of communication device 110a, which may store various applications and data and be utilized during execution of various modules of communication device 110a. Database 116 may include, for example, identifiers such as operating system registry entries, cookies associated with device application 112 and/or other applications 114, identifiers associated with hardware of communication device 110a, or other appropriate identifiers, such as identifiers used for payment/user/device authentication or identification, which may be communicated as identifying communication device 110a to transaction processor server 130. Database 116 may include data generated during use of device application 112 and execution of one or more processes, including data necessary to identify the process, a state of the process and entered input or data for the process, actions taken during the process, and/or data related to abandonment of the process. Moreover, received output data of an incentive used to reenter or complete an abandoned process, including one or more incentives, may be stored in database 116.

Communication device 110a includes at least one communication module 118 adapted to communicate with merchant device 120 and/or transaction processor server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Communication device 110b may be implemented as a communication device that may utilize appropriate hardware and software configured for wired and/or wireless communication with merchant device 120 and/or transaction processor server 130, and may be used by the same user associated with communication device 110a to previous abandon one or more processes, such as electronic transaction processing for a digital shopping cart. For example, in one embodiment, communication device 110b may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110b may utilize an application to execute one or more application processes, which may utilize merchant device 120 and/or transaction processor server 130. Communication device 110b may execute another instance or copy of device application 112 from communication device 110a, or may utilize a different application that may similarly have an instance of executable code to detected abandonment actions within a process. Communication device 110b may receive user input and/or other processing input or requests that cause communication device 100b to perform an operation or task. Where the application process corresponds to a shopping, purchase, and electronic transaction processing process, communication device 110b may be utilized to view one or more items for sale, select items of interest for purchase, add those items to a previous digital shopping cart, and complete electronic transaction processing for the previous digital shopping cart through providing an account or other payment instrument used to provide payment for the digital shopping cart. Communication device 110b may abandon the executing process, such as the previous digital shopping cart by quitting from the process or not providing further user input that completes the process.

Thus, user input or another action may correspond to the user input that causes communication device 110b to quit and abandon the process so that the process is not completed. For example, previous actions taken with a previously generated digital shopping cart may abandon the cart by navigating to another user interface, tab, or application, closing of the application through a command or input (e.g., moving a mouse to an interface field or option to close the application), entry of a hotkey or shortcut to move to another interface or application or close the application, remove items from a digital shopping cart, navigating to another website, or otherwise providing input that is associated with an abandoned process. The use or process of communication device 110b may be provided to transaction processor server 130 for determination of historical application usage of the user and/or account associated with communication device 110a and communication device 110b, which may be used to determine whether communication device 110a is currently attempting or causing abandonment of another present process, such as abandonment of a currently pending digital shopping cart. The historical usage information may then be stored with the account and used by transaction processor server 130.

Merchant device 120 may be implemented as a communication device that may utilize appropriate hardware and software configured for wired and/or wireless communication with communication device 110a and/or transaction processor server 130. For example, in one embodiment, merchant device 120 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Merchant device 120 of FIG. 1 contains an online merchant application 122, other applications 124, a database 126, and a communication module 128. Online merchant application 122 and other applications 124 may correspond to executable processes, procedures, and/or applications with associated hardware. In other embodiments, merchant device 120 may include additional or different modules having specialized hardware and/or software as required.

Online merchant application 122 may correspond to one or more processes to execute modules and associated specialized hardware of merchant device 120 that provide online sales, checkout, and payment processes for a transaction to purchase one or more items for sale from the user, such as a merchant or seller, corresponding to merchant device 120, including providing data for items available from a merchant on an online marketplace or accessible through a website or dedicated application. In this regard, online merchant application 122 may correspond to specialized hardware and/or software of merchant device 120 to provide a convenient interface to permit a merchant to enter, view, and/or edit items and/or services for purchase by the user associated with communication device 110a. For example, online merchant application 122 may be implemented as an application having a user interface enabling the merchant to enter item information and place one or more items for sale through data accessible using device application 112.

In certain embodiments, online merchant application 122 may correspond more generally to a web browser application configured to view and provide information available over the Internet or access a website corresponding to the merchant and/or an online marketplace utilized by the merchant to provide item data for items for sale and post data for device application 112 to retrieve and utilize to process an electronic transaction for one or more items. Thus, the data provided by online merchant application 122 may be utilized to generate a digital shopping cart by device application 112, where the digital shopping cart may be processed and/or abandoned by actions taken using device application 112. In this regard, transaction processor server 130 may utilize data from online merchant application 112 to store data for an abandoned digital shopping cart, as well as generate an incentive for the digital shopping cart.

Once a payment amount is determined for a transaction for items to be purchased by the user associated with device application 112, online merchant application 122 may request payment from the user for transaction processing of a digital shopping cart including the items. Payment may be provided through a token for an account associated with communication device 110a. The token may be communicated to merchant device 120, which may be used with the transaction and transaction information for processing. In other embodiments, other data may be provided for transaction processing, including financial information and/or authentication information necessary for use an account for transaction processing. Transaction processor server 130 may process the transaction with the provided token, which may include incentives provided by transaction processor server 130 for completing an abandoned digital shopping cart. Online merchant application 122 may then receive the results of the transaction processing, and complete the transaction with the respective user, for example, by providing (e.g., shipping) the items for the transaction or declining the transaction where the user is not authenticated or the transaction is not authorized (e.g., insufficient funds, rejection of the transaction based on risk analysis). A transaction history may then be generated by online merchant application 122.

Moreover, it is noted that online merchant application 122 may also perform one or more of the processes described herein of transaction processor server 130, for example, through implement code or other software packages provided by transaction processor server 130 into one or more applications, websites, or processes utilized or provided by merchant device 120. In this regard, online merchant application 122 may provide one or more of the abandonment detection processes and/or incentive process to complete a digital shopping cart on detection of abandonment that are discussed with reference to abandonment detection application 140.

In various embodiments, merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking applications. Other applications 124 may also include other location detection applications, which may be used to determine a location for the user, such as a mapping, compass, and/or GPS application, which can include a specialized GPS receiver that obtains location information for merchant device 120 and processes the location information to determine a location of merchant device 120 and the user. Other applications may include social networking applications, media viewing, and/or merchant applications. Other applications 124 may include device interface applications and other display modules that may receive input from the user and/or output information to the user. For example, other applications 124 may contain software programs, executable by a processor, including a graphical user interface (GUI) configured to provide an interface to the user. Other applications 124 may therefore use devices of merchant device 120, such as display devices capable of displaying information to users and other output devices, including speakers.

Merchant device 120 may further include database 126 stored to a transitory and/or non-transitory memory of merchant device 120, which may store various applications and data and be utilized during execution of various modules of merchant device 120. Database 126 may include, for example, identifiers such as operating system registry entries, cookies associated with online merchant application 122 and/or other applications 124, identifiers associated with hardware of merchant device 120, or other appropriate identifiers, such as identifiers used for payment/user/device authentication or identification. In various embodiments, database 126 may information for items for sale, such as item data necessary to generate a transaction to purchase one or more of the items and/or add the items to a digital shopping cart for processing. Database 126 may also store data for pending and/or abandoned digital shopping carts, and may include incentives available for processing pending and/or abandoned carts.

Merchant device 120 includes at least one communication module 128 adapted to communicate with communication device 110a and/or transaction processor server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices (e.g., merchant device 120) using short range communications, such as Bluetooth Low Energy, LTE Direct, WiFi, radio frequency, infrared, Bluetooth, and near field communications.

Transaction processor server 130 may be maintained, for example, by an online service provider, which may provide transaction processing services on behalf of users and/or merchants including generation and/or processing of digital shopping carts. In this regard, transaction processor server 130 includes one or more processing applications which may be configured to interact with communication device 110a, merchant device 120, and/or another device/server to facilitate transaction processing. In one example, transaction processor server 130 may be provided by PAYPAL®, Inc. of San Jose, Calif., USA. However, in other embodiments, transaction processor server 130 may be maintained by or include another type of service provider, which may provide connection services to a plurality of users.

Transaction processor server 130 of FIG. 1 includes an abandonment detection application 140, a transaction processing application 132, other applications 134, a database 136, and a network interface component 138. Abandonment detection application 140, transaction processing application 132, and other applications 134 may correspond to executable processes, procedures, and/or applications with associated hardware. In other embodiments, transaction processor server 130 may include additional or different modules having specialized hardware and/or software as required.

Abandonment detection application 140 may correspond to one or more processes to execute software modules and associated specialized hardware of transaction processor server 130 to analyze past historical application usage and processes data with a currently executing process on communication device 110a and an action taken during the currently executing process to determine whether the action indicates a likely abandonment of the process, and further generate an incentive to complete the process if the action indicates abandonment. In this regard, abandonment detection application 140 may correspond to specialized hardware and/or software to receive information of past uses and executing processes by a device, for example, during use of device application 112 on communication device 110a as well as other instances and/or copies of device application 112 on other devices, such as a similar copy of device application 112 executed by communication device 110b or communication device 110b including another application that accesses, executes, or otherwise utilizes a copy or instance of a code package, snippet, or process that provides detection of abandonment actions.

The past uses may include which processes were complete and which were abandoned during processing so that the process was not completed. Based on those processes that were abandoned, actions taken that led to the abandonment (e.g., a task or operation to close an application or interface window, leave a process, end a current operation, or other input that causes the process to quit or stop processing before a completion state) may be determined and may be linked to potential abandonment of the process. The actions may be general for a population of users, or may be specific to particular users, devices, accounts, or application so that trends in behavior of the particular entity when leading to an abandonment may be detected and determined. Where the process corresponds to online shopping and abandonment of a shopping cart of items, the actions that cause or led to the shopping cart not being processed electronically using merchant device 120 and/or transaction processor server 130 may be determined, such as closing a window through a mouse action or keyboard input, locking or powering off communication device 110a, navigating to another website or application, or other user input. This user input may therefore indicate that the user providing the user input will likely abandon another shopping cart when received during a further shopping cart generation and/or processing process.

After processing the historical data to determine which actions were associated, caused, or indicated abandonment of the process (which may be general or device, user, account, and/or application specific), abandonment detection application 140 may execute during one or more processes to detect whether actions, tasks, or operations performed based on user or device requests/input during the process indicates abandonment through comparison and analysis of the historical application usage data. For example, communication device 110a may engage in another process, such as an online shopping session using data and/or online resources provided by merchant device 120 over network 150. Communication device 110a may generate a digital shopping cart having one or more items. After generation of the cart and prior to checkout and electronic transaction processing to provide a payment for the items in the cart, user input or another executable action may be provided. The action may be the same or similar to past actions that also occurred at the time of abandonment or led to abandonment of the process, such as by quitting the process, application, or otherwise cause communication device 110a to end the process.

In certain embodiments, a similarity score of the input or other action may be determined, which may be required to meet a threshold or set score to determine that the action indicates abandonment or potential abandonment of the process, such as abandonment of the shopping cart so that the payment is never processed and the shopping cart is completed. If the action is not sufficient or the same/similar to past actions that would cause abandonment of the process, abandonment detection application 140 may do nothing and may continue to monitor the process and processing and input provided by communication device 110a. However, if the action indicates abandonment of the process, or potential abandonment, then abandonment detection application 140 may determine that the process (e.g., the digital shopping cart for the shopping session) is or may be abandoned and an incentive or other information may be provided to incentivize the user of communication device 110a to complete the process instead of quit or abandon the process.

If the action taken in the pending or currently executing process indicates that communication device 110a will abandon the process and fail to complete the process, abandonment detection application 140 may generate output data for an incentive that incentivizes the user of communication device 110a to complete the process. For example, where an action of closing a window or application having a shopping cart is detected and based on past historical data, that action indicates that the user will not likely finish electronic transaction processing to purchase the items in the shopping cart, abandonment detection application 140 may respond by generating output data for a benefit, reward, discount, or other incentive for the user to finish processing the shopping cart, such as a monetary reward or discount to finish electronic transaction processing of the digital shopping cart. The output data may include a notification or alert that informs the user that an abandonment action is detected and will result in abandoning and/or failing to finish the process (e.g., purchase the items and process a transaction for the shopping cart). The notification may further include the incentive, and may provide one or more processes to reenter or continue the abandoned process, including retrieval of process data for the abandoned process, as well as redeem the incentive. The output data may be communicated to communication device 110a and may be displayed to the user, as discussed herein.

One or more of the processes discussed herein of abandonment detection application 140 may be provided in merchant device 120, for example, by online merchant application 122 to provide the described processes for process abandonment detection and incentive generation to resume and complete an abandoned process. Abandonment detection application 140 may provide a software package, code snippet, implementable process, and/or software development kit to implement the processes described herein for abandonment detection application in a website and/or application provided by merchant device 120.

Transaction processing application 132 may correspond to one or more processes to execute software modules and associated specialized hardware of transaction processor server 130 to provide payment and transaction processing services to merchants and users, for example though an account and/or payment instruments of the user to an account of the merchant, where the service may include services associated with completing a process for electronic transaction process, which may complete an abandoned shopping session and digital shopping cart. In this regard, transaction processing application 132 may correspond to specialized hardware and/or software to provide transaction processing and payment services through accounts, including digital wallets storing payment instruments. The services may allow for a payment through a payment instrument, including a credit/debit card, banking account, payment account with transaction processor server 130, and/or other funding instrument. The payment may be used to provide a payment for a digital shopping cart. In order to establish an account to send and receive payments, transaction processing application 132 may receive information requesting establishment of the account. The information may include user personal, business, and/or financial information.

Additionally, the information may include a login, account name, password, PIN, or other account creation information. The entity establishing the account may provide a name, address, social security number, or other personal or business information necessary to establish the account and/or effectuate payments through the account. Transaction processing application 132 may further allow the entity to service and maintain the payment account, for example, by adding and removing funding instruments. Transaction processing application 132 may be used to provide a payment for a digital shopping cart, including payment for a previously abandoned or potentially abandoned cart that may be completed with a provided incentive to process the shopping cart. Transaction processing application 132 may process the payment for the digital shopping cart, and may process the payment with a provided incentive, such as a discount, reward, or other benefit. Transaction processing application 132 may debit an account of the user and provide the payment to an account of the merchant. Transaction processing application 132 may also be used to provide transaction histories for processed transactions.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. As previously discussed, the user and/or the merchant may establish one or more digital wallets and/or accounts with transaction processor server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from communication device 110a, one or more digital wallets and/or payment accounts belonging to the users may be found. Database 136 may also store historical application usage data of abandoned and/or completed processes, and actions that led to abandonment and/or completion. Additionally, currently executing and/or recently abandoned process data may be stored in database 136 with an incentive provided to complete the process.

In various embodiments, transaction processor server 130 includes at least one network interface component 138 adapted to communicate communication device 110a and/or merchant device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2B:
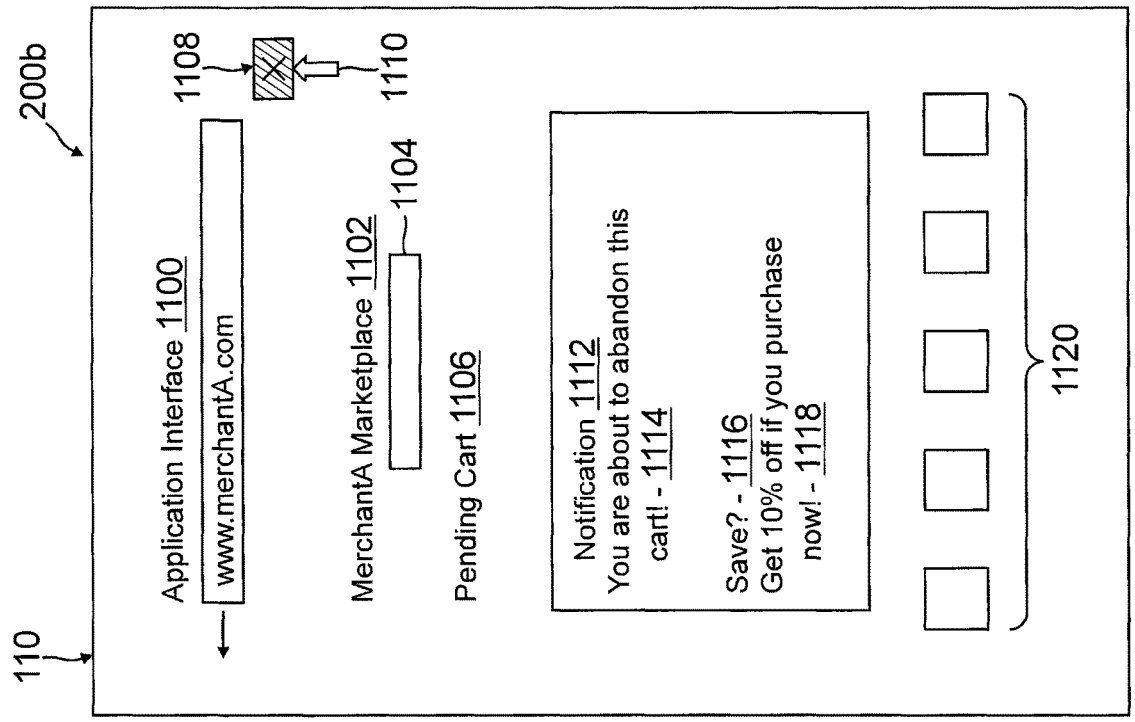
FIG. 2B is an exemplary user interface of a device displaying predictive data output based on a previously occurring action taken during use of an application, according to an embodiment.
Figure 2A:
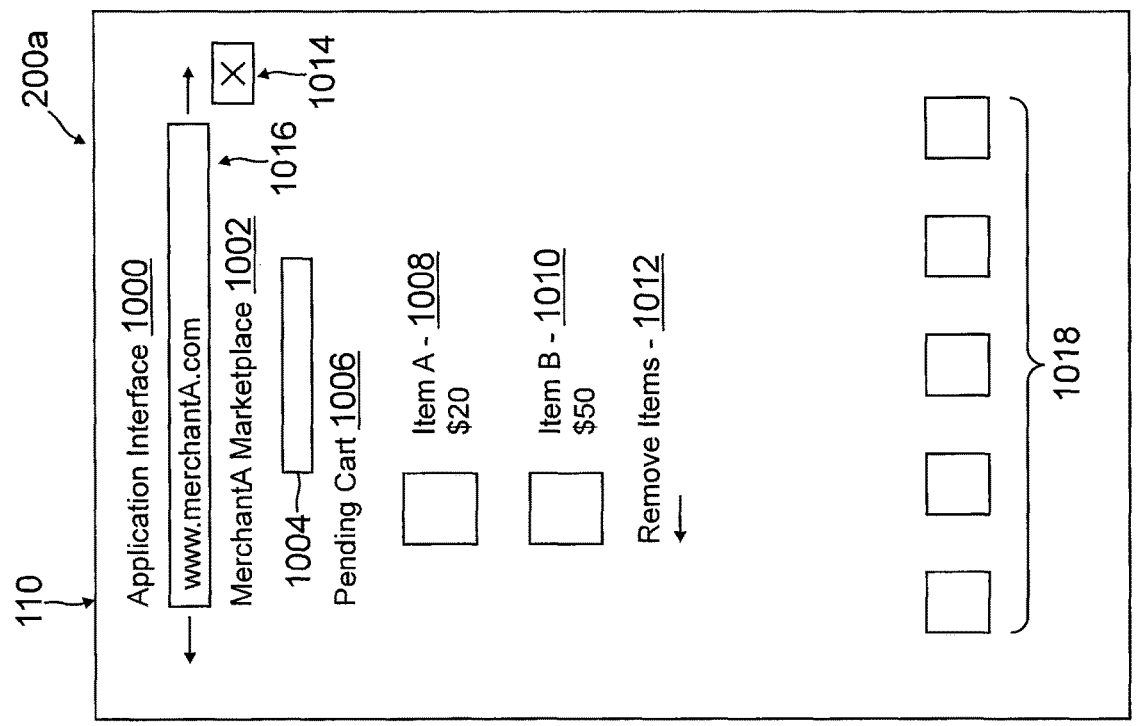
FIG. 2A is an exemplary user interface of a device when receiving user input of an action taken during use of an application, according to an embodiment.

FIG. 2A is an exemplary user interface of a device when receiving user input of an action taken during use of an application, according to an embodiment. Environment 200a includes an application interface 1000 output by communication device 110a having the described features, processes, and components discussed in reference to system 100 of FIG. 1. In this regard, a user viewing application interface 1000 in environment 200a may view displayed data from processes executed by one or more of the applications discussed in reference to communication device 110a.

Application interface 1000 of communication device 110a may display data during an executing process of an application, such as application output data that may be displayed during a session of use of the application. For example, application interface 1000 may display a navigation window of a browser application, which may display an accessed website for a merchant A marketplace 1002. Application interface 1000 may further display a search field 1004 used to browse and/or find items for sale during an online shopping session with merchant A marketplace 1002. For example, search field 1004 may be used to add items to a pending cart 1006, which may correspond to a digital shopping cart used to "hold" items for purchase as well as perform electronic transaction processing to purchase those items.

Pending cart 1006 is shown having an item A 1008 and an item B 1010. During use of merchant A marketplace 1002, the process to generate pending cart 1006 having item A 1008 and item B 1010 may be completed through processes to checkout and purchase the items through electronic transaction processing. However, other user actions and/or input may also be used to abandon the process before completing processing of pending cart 1006. For example, one or more interface options on merchant A marketplace 1002 may allow a user to remove items from pending cart 1006, close application interface 1000, navigate to another interface or website, and/or navigate to another application on communication device 110a. For example, a remove items option 1012 may allow a user to remove items from the shopping cart, thereby abandoning electronic transaction processing for such items.

Similarly, a close window option 1014 may be selected to close out of application interface 1000 prior to completing pending cart 1006 and utilize different functions of communication device 110a. A user may also utilize website navigation field 1016 to type and/or navigate to another website or webpage of a particular website, or may navigate to another one of applications 1018, prior to completing pending cart 1006. Thus, the user may provide multiple inputs that may not cause completion of pending cart 1006 and abandon pending cart 1006 so that item A 1008 and item B 1010 are not purchased and a transaction is not completed for those items.

FIG. 2B is an exemplary user interface of a device displaying predictive data output based on a previously occurring action taken during use of an application, according to an embodiment. Environment 200b includes an application interface 1100 output by communication device 110a having the described features, processes, and components discussed in reference to system 100 of FIG. 1. In this regard, a user viewing application interface 1100 in environment 200b may view displayed data from processes executed by one or more of the applications discussed in reference to communication device 110a.

Application interface 1100 of communication device 110a may display data during an executing process of an application, such as application output data that may be displayed during a session of use of the application. For example, application interface 1100 may display a navigation window of a browser application, which may display an accessed website for a merchant A marketplace 1102. Application interface 1100 may further display a search field 1104 used to browse and/or find items for sale during an online shopping session with merchant A marketplace 1002. For example, search field 1104 may be used to add items to a pending cart 1106, which may correspond to a digital shopping cart used to hold items for purchase as well as perform electronic transaction processing to purchase those items.

In application interface 1100 of environment 200b, an action, task, or operation has been requested that causes closure of application interface 1100 or otherwise abandons pending cart 1106 of application interface 1100. For example, in environment 200b, application interface 1100 of communication device 110a is shown having a close window option 1108 as being hovered over for selection through a mouse cursor input 1110. This action may correspond to an executable task by the device displaying application interface 1100 that may cause abandonment of pending cart 1106 so that pending cart 1106 is not completed and processed through a transaction to purchase items in pending cart 1106. Other types of input may also cause abandonment, such as navigation to one of application 1120.

In this regard, one or more processes provided by a service provider and/or through an implementable code snippet into the website or other processes for merchant A marketplace 1102 may be used to provide an incentive that may be displayed prior to abandonment or after abandonment to incentivize the user to complete pending cart 1106. For example, prior to completing the task to select close window option 1108 using mouse cursor input 1110, notification 1112 may be displayed that states, "You are about to abandon this cart!" in message 1114. Notification 1112 may include a save option 1116 to store data for pending cart 1106 so that it may be recalled, processed, and complete later. Moreover, an incentive 1118 may be provided that offers, "Get 10% off if you purchase now." Thus, using notification 1112, a user may receive a benefit or discount to return and complete pending cart 1106 instead of abandon pending cart 1106 through mouse cursor input 1110.

Figure 3:
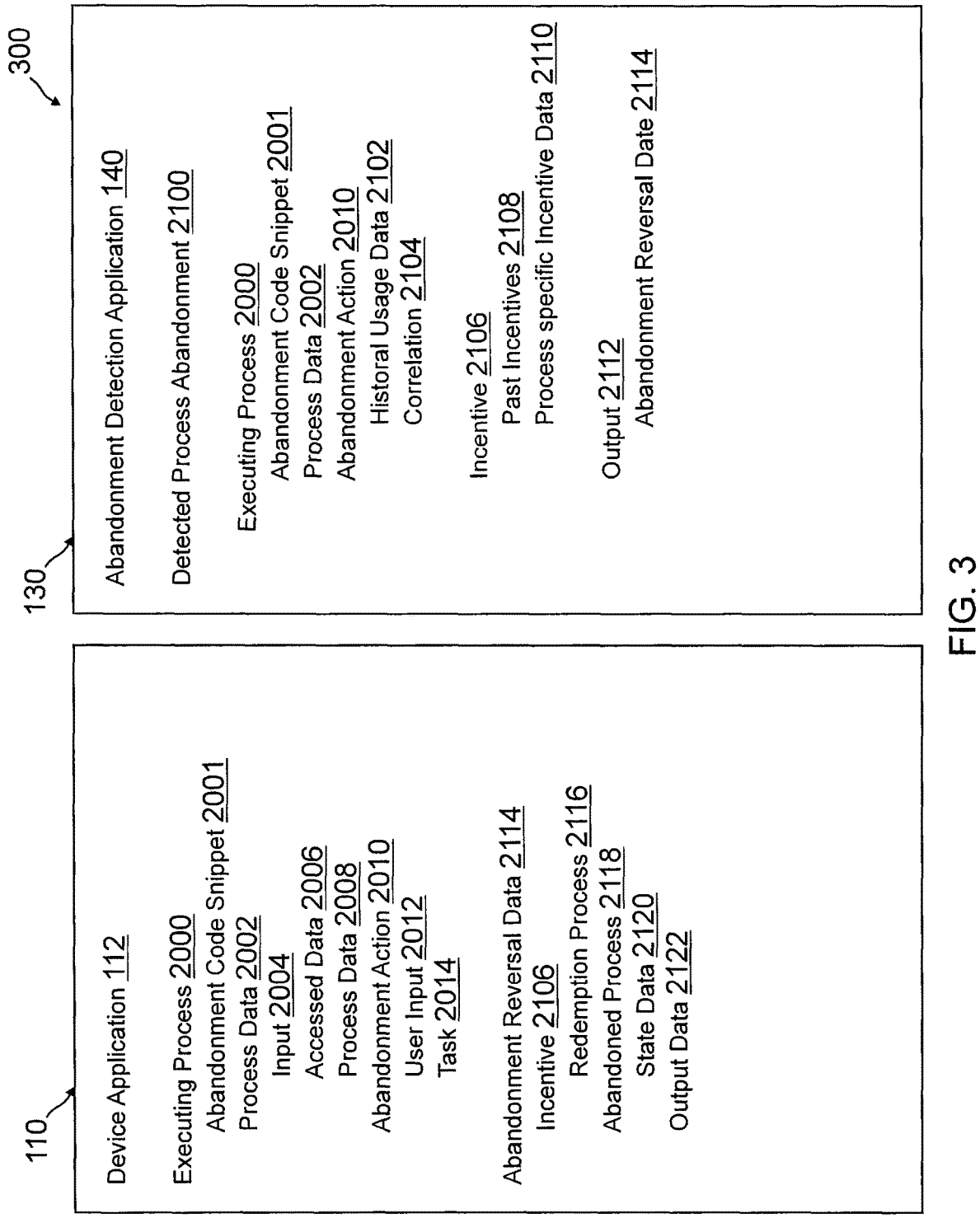
FIG. 3 is an exemplary system environment where a communication device and a service provider may interact to process user input of device application usage and actions for predictive data output, according to an embodiment.

FIG. 3 is an exemplary system environment where a communication device and a service provider may interact to process user input of device application usage and actions for predictive data output, according to an embodiment. FIG. 3 includes communication device 110a and transaction processor server 130 discussed in reference to system 100 of FIG. 1.

In environment 300, communication device 110a executes device application 112 corresponding generally to the processes and features discussed in reference to system 100 of FIG. 1. In this regard, communication device 110a may utilize device application 112 to execute one or more processes, which may include processes with an online resource, such as a merchant, to generate a digital shopping cart for purchase of one or more items. Device application 112 therefore includes an executing process 2000, such as an online shopping session having items in a digital shopping cart. Executing process 2000 may be monitored using abandonment code snippet 2001, which may be implemented in a merchant platform by the merchant using code and/or software provided by service provider server 130. Process data 2002 may therefore include data for the current use of device application 112 including the online resource, such as input 2004 provided to device application 112, accessed data 2006 from an online resource, and/or processed data 2008 between device application 112 and the online resource. Executing process 2000 may also be associated with an abandonment action 2010, which may correspond to user input 2012 that causes task 2014 to end executing process 2000 prior to completion of executing process 2000, such as a closure of an operation, navigation to another operation, or other task that may end executing process 2000 without completing the process, such as purchasing the items in the digital shopping cart. Such data may be transmitted to transaction processor server 130 for detection of abandonment action 2010 and generation of an incentive. However, in other embodiments, the online resource, such as the merchant, may implement code and processes to provide the described processes herein by transaction processor server 130 directly through a website or dedicated application of the resource.

In environment 300, transaction processor server 130 executes abandonment detection application 140 corresponding generally to the processes and features discussed in reference to system 100 of FIG. 1. In this regard, transaction processor server 130 may utilize abandonment detection application 140 to receive abandonment action 2010 during executing process 2000 and utilize stored data to determine whether abandonment action 2010 indicates abandonment of executing process 2000 and what incentive to provide to incentivize completion of executing process 2000. Abandonment detection application 140 therefore includes detected process abandonment 2100 for executing process 2000. Detected process abandonment 2100 may detect executing process 2000 through abandonment code snippet 2001, which may be similarly implemented in or executed by device application 112 through a merchant platform that utilizes abandonment code snippet 2001. Detected process abandonment 2100 may be detected by abandonment code snippet 2001 using process data 2002 and abandonment action 2010 with historical usage data 2102 to determine whether there is a correlation 2104 between abandonment action 2010 and past actions causing process abandonment in historical usage data 2102.

If correlation 2104 indicates that abandonment action 2010 will likely cause abandonment of executing process 2000, abandonment detection application may generate an incentive 2106 for detected process abandonment 2100. Incentive 2106 may be determined based on past incentives 2108, as well as process specific incentive data 2110, such as items in a digital shopping cart, merchant specific or item specific discounts, and/or incentives specifically tailored to the user, account, or device abandoning executing process 2000 (e.g., based on past conversions of abandoned process to completion of the process). Abandonment detection application 140 may then generate output 2112, which may include abandonment reversal data 2114 for communication device 110*a*.

Communication device 110*a* may then receive abandonment reversal data 2114 for executing process 2000. Device application 112 may be used to output abandonment reversal data 2114 prior to completion of abandonment action 2010 and/or after completion of abandonment action 2010. Abandonment reversal data 2114 includes data for incentive 2106, as well as a redemption process for incentive 2106 that allows device application 112 to apply incentive 2106 to executing process 2000. Additionally, abandonment reversal data 2114 may include data for abandoned process 2118, such as state data 2120 for executing process 2000 that allows recall of executing process 2000. Abandonment reversal data 2114 may then be output using output data 2122.

Figure 4:
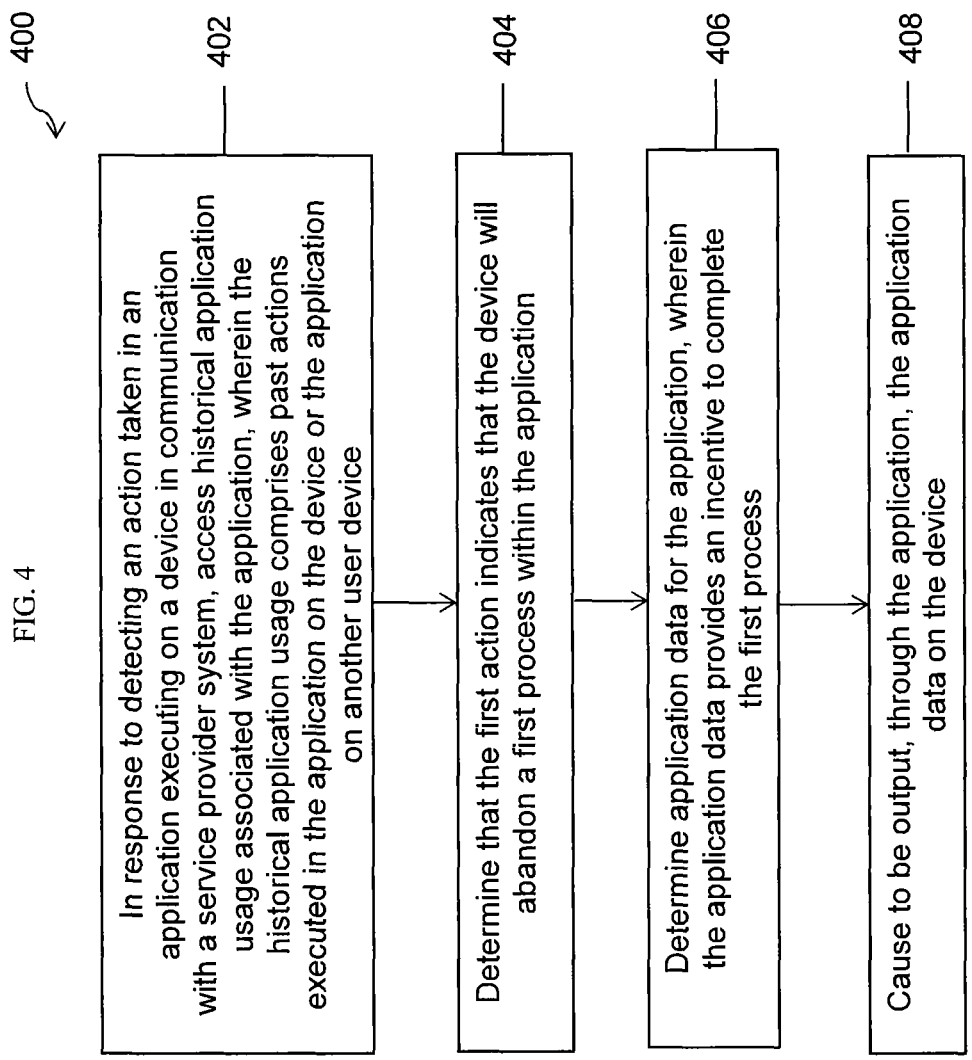
FIG. 4 is a flowchart of an exemplary process for monitoring device application usage for completion of checkout data processing, according to an embodiment.

FIG. 4 is a flowchart 400 of an exemplary process for monitoring device application usage for completion of checkout data processing, according to an embodiment. Note that one or more steps, processes, and methods described herein may be omitted, performed in a different sequence, or combined as desired or appropriate.

At step 402 of flowchart 400, in response to detecting a first action taken in an application executing on a device through a platform application process executed by a first platform, past application usage associated with the application is accessed, wherein the past application usage is detected across a plurality of platforms. The first action may comprise one of a navigation to another interface or webpage in the application, a first request to quit the application, a second request to close an interface window of the application, or a third request to remove items from a shopping cart generated using the application. Prior to this, a respective instance of a code snippet associated with the platform application process is implemented in each of the plurality of platforms including the first platform, wherein execution of the code snippet by each of the plurality of platforms causes a detection of an abandonment action including the first action. The respective instance of the code snippet may be implemented in each of the plurality of platforms in response to generating an electronic checkout process having one or more digital shopping cart interfaces for each of the plurality of platforms and establishing the electronic checkout process in a respective website or a respective application of each of the plurality of platforms. A past action associated with an account utilized with the first platform to perform the first action during a previous use session of the application on the device or on another device may be received, and the past application usage may be determined using the past action. The past action may further comprise past device inputs associated with a past abandonment action from a same use or a similar use of an online service and/or service provider providing the first checkout process.

The application may comprise a first application and the device may execute a second application, wherein the first action comprises a navigation from the first application to the second application, and wherein an executable code snippet or package of an online service provided by the first platform from a service provider detects the action in an online marketplace of a first merchant. The first application may comprise one of a web browser application or a dedicated device application, wherein the use of the online service comprises a shopping use of an online marketplace on the first platform that implements the executable code snippet or package in the first checkout process to detect the first action through the first application.

The first application may be used to access online marketplace of the first platform, wherein the first checkout process may be generated during a shopping session on the online marketplace, and wherein the navigation from the first application to the second application comprises opening a shopping process of a second merchant in the second application. The first action may also comprise a price check or a lookup of a same item or a similar item in the second application with another merchant. In this regard, the platform application process may be provided by an executable code process in a platform implemented checkout process that generated data for the first checkout process. This executable code process may be used to monitor the checkout process to detect abandonment, such as when the first action comprises a user input that navigates a user interface away from the first platform.

The previous use session may comprises a previous checkout process with one of the plurality of platforms, wherein the past action is received from the one of the plurality of platforms during the previous use session, and wherein the past action comprises a past digital shopping cart completion action or a past digital shopping cart abandonment action during the previous use session. A transaction to purchase an item in a digital shopping cart generated during the previous use session may not have been completed in the previous use session based on the past action, wherein the determining that the first action indicates that the first checkout process will likely be abandoned comprises determining that the first action matches the past action.

The first checkout process may comprise a generation of a digital shopping cart with an online merchant providing the first platform, wherein the first action causes an abandonment of the digital shopping cart prior to processing the digital shopping cart. Thus, detecting the first action may comprises receiving the first action from the first platform through the platform application process, wherein the platform application process begins execution on the first platform after the device begins the first checkout process with the first platform. Process data for the first checkout process at a time of the abandonment of the first checkout process may be determined based on the first action, and the process data may be stored in at least one of a local database in the non-transitory memory or the first platform At step 404 of flowchart 400, it is determined that the first action indicates that a first checkout process within the application will be abandoned. Application data for the application is determined, at step 406 of flowchart 400, wherein the application data comprises message data associated with the first checkout process and needed to complete a subsequent checkout process. The application data is caused to be output on the device, wherein the application data displays the message data in an interface element of the device, at step 408 of flowchart 400. Additionally, the process of flowchart 400 may further include receiving a second action in the application from the device and determining that the second action requests use of the message data to prevent the abandonment of the first checkout process with the first platform. In response, the application on the device may be redirected to a state of the first checkout process prior to the abandonment using the process data. This may also include communicating a message in the application data with data for a digital shopping cart generated during the first checkout process to the first platform.

Figure 5:
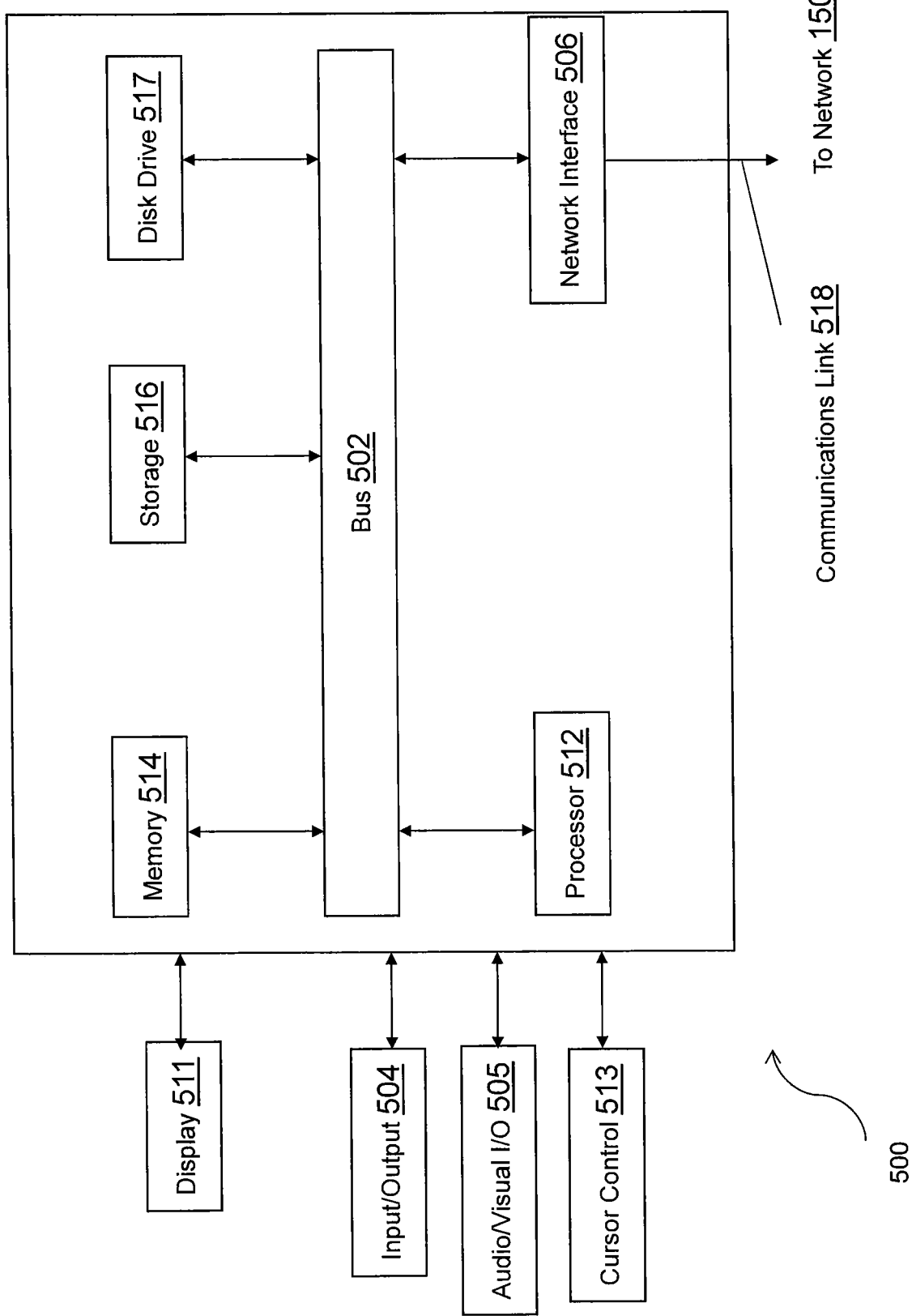
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.).

An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing instructions; and
   one or more hardware processors couple to the non-transitory memory and configured to read the instructions from the non-transitory memory to cause the system to perform operations comprising:
   detecting a first action taken in an application executing on a device through a platform application process executed by a first platform;
   accessing past application usage associated with the application, wherein the past application usage is detected across a plurality of platforms including the first platform by other devices and the device;
   determining a weighted score of the first action based on past actions by the other devices from the past application usage and a past action by the device from the past application usage;
   determining that the first action indicates that a first checkout process within the application will be abandoned based on the weighted score exceeding a threshold score;
   determining application data for the application, wherein the application data comprises message data associated with the first checkout process and needed to complete a subsequent checkout process; and
   causing the application data to be output on the device, wherein the application data displays the message data in an interface element of the device.

2. The system of claim 1, wherein prior to detecting the first action, the operations further comprise:
   implementing a respective instance of a code snippet associated with the platform application process at each of the plurality of platforms including the first platform, wherein execution of the respective instance of the code snippet at each of the plurality of platforms causes a detection of an abandonment action including the first action.

3. The system of claim 2, wherein the respective instance of the code snippet is implemented in each of the plurality of platforms in response to generating an electronic checkout process having one or more digital shopping cart interfaces for each of the plurality of platforms and establishing the electronic checkout process in a respective website or a respective application of each of the plurality of platforms.

4. The system of claim 1, wherein prior to detecting the first action, the operations further comprise:
   receiving the past action associated with an account utilized with the first platform to perform the first action during a previous use session of the application on the device or on another device; and
   determining the past application usage using the past action.

5. The system of claim 4, wherein the previous use session comprises a previous checkout process with one of the plurality of platforms, wherein the past action is received from the one of the plurality of platforms during the previous use session, and wherein the past action comprises a past digital shopping cart completion action or a past digital shopping cart abandonment action during the previous use session.

6. The system of claim 4, wherein a transaction to purchase an item in a digital shopping cart generated during the previous use session was not completed in the previous use session based on the past action.

7. The system of claim 1, wherein the first checkout process comprises a generation of a digital shopping cart with an online merchant providing the first platform, and wherein the detecting the first action comprises:
   receiving the first action from the first platform through the platform application process, wherein the platform application process begins execution on the first platform after the device begins the first checkout process with the first platform.

8. The system of claim 7, wherein the operations further comprise:
   determining process data for the first checkout process at a time of an abandonment of the first checkout process based on the first action; and
   storing the process data in at least one of a local database or the first platform.

9. The system of claim 8, wherein the operations further comprise:
   receiving a second action in the application from the device;
   determining that the second action requests use of the message data to prevent the abandonment of the first checkout process with the first platform; and
   redirecting the application on the device to a state of the first checkout process prior to the abandonment using the process data.

10. The system of claim 1, wherein the first action comprises one of a navigation to another interface or webpage in the application, a first request to quit the application, a second request to close an interface window of the application, or a third request to remove items from a shopping cart generated using the application.

11. A method comprising:
    receiving, by a service provider, an action executed by a device during a use of an online service provided by the service provider, wherein the action is received through an executable process implemented an online marketplace utilizing the online service;
    determining past actions executed by the device and other devices with at least one of the online service or the online marketplace;
    determining a weighted score of the action based on the past actions executed by the device and the other devices;

determining that the device will not complete a transaction through the online service based on the action and the weighted score exceeding a threshold score;

determining completion data for the use of the online service, wherein the completion data provides application output data to enable completion of the transaction; and outputting, through a first application executing on the device, the completion data on the device.

12. The method of claim 11, wherein the device executes a second application, wherein the action comprises a navigation from the first application to the second application, and wherein an executable code package of the online service detects the action in the online marketplace of a first merchant.

13. The method of claim 12, wherein the first application accesses the online marketplace of the first merchant, wherein the online service comprises a shopping session on the online marketplace, and wherein the navigation from the first application to the second application comprises opening a shopping process of a second merchant in the second application.

14. The method of claim 11, wherein prior to the receiving the action executed by the device, the method further comprises:

providing, through the online service hosted by the service provider, the online service in an online marketplace platform, wherein the online service comprises a checkout process used to generate and process a digital shopping cart on the online marketplace platform, wherein the checkout process causes execution of an executable code process to detect an abandonment action including the action.

15. The method of claim 11, wherein the use of the online service of the service provider comprises at least one electronic transaction generating event on the online marketplace for an item for purchase that is monitored using the executable process implemented in the online marketplace from a processing service provided by the service provider, and wherein the action comprises a user input that navigates a user interface away from the online marketplace.

16. The method of claim 15, wherein the past actions further comprise past device inputs associated with a past abandonment action from a same use or a similar use of the online service to the use of the online service.

17. The method of claim 11, wherein the use of the online service comprises a shopping session on the online marketplace of a merchant, and wherein the action comprises a price check or a lookup of a same item or a similar item in a second application with another merchant.

18. The method of claim 11, wherein the first application comprises one of a web browser application or a dedicated device application, and wherein the use of the online service comprises a shopping use of the online marketplace that implements the executable process in a checkout process to detect the action through the first application.

19. A non-transitory machine-readable medium having stored thereon machine-readable instructions executable to cause a machine to perform operations comprising:

receiving, by a service provider, first user input during use of an application of a mobile device, wherein the first user input comprises an action executed in the application during use of an online marketplace for a merchant;

determining past actions executed by the mobile device and other devices with at least one of the application or the online marketplace;

determining a weighted score of the first user input based on the past actions executed by the mobile device and the other devices;

determining, by the service provider based on the weighted score exceeding a threshold score, that the first user input indicates that the action abandons a digital shopping cart comprising an item available on the online marketplace generated during the use of the application;

determining, the service provider, notification data comprising an executable process to redirect an interface of the mobile device to the digital shopping cart and a message associated with completing the digital shopping cart with the online marketplace; and causing to be displayed, through an output display of the mobile device, the notification data, wherein the notification data comprises the message and provides the executable process to access the digital shopping cart on the online marketplace.

20. The non-transitory machine-readable medium of claim 19, wherein the operations further comprise:

in response to receiving second user input requesting redemption of the message with the digital shopping cart, accessing the online marketplace through the application; and communicating the message and cart data for the digital shopping cart to the online marketplace.

* * * * *